(12) United States Patent
Roy et al.

(10) Patent No.: US 11,632,412 B1
(45) Date of Patent: Apr. 18, 2023

(54) SYSTEMS AND METHODS FOR SCORING AUDIO OR VIDEO SESSIONS

(71) Applicant: Citrix Systems, Inc., Fort Lauderdale, FL (US)

(72) Inventors: Vinay George Roy, Bengaluru (IN); Vikramjeet Singh Sandhu, Bangalore (IN); Rishabh Agarwal, Bellandur (IN); Mukesh Garg, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/829,777

(22) Filed: Jun. 1, 2022

(30) Foreign Application Priority Data

Apr. 14, 2022 (IN) .............................. 202241022278

(51) Int. Cl.
| | |
|---|---|
| *G06F 13/00* | (2006.01) |
| *H04L 65/80* | (2022.01) |
| *H04L 43/087* | (2022.01) |
| *H04L 43/0829* | (2022.01) |
| *H04L 43/0864* | (2022.01) |
| *H04L 43/0817* | (2022.01) |

(52) U.S. Cl.
CPC ............ *H04L 65/80* (2013.01); *H04L 43/087* (2013.01); *H04L 43/0817* (2013.01); *H04L 43/0841* (2013.01); *H04L 43/0864* (2013.01)

(58) Field of Classification Search
CPC . H04L 65/80; H04L 43/0817; H04L 43/0841; H04L 43/0864; H04L 43/087
USPC ....... 709/231, 217–219, 227, 228, 230, 224; 703/2, 13
See application file for complete search history.

(56) References Cited

U.S. PATENT DOCUMENTS

| | | | | |
|---|---|---|---|---|
| 2013/0086279 | A1* | 4/2013 | Archer ................... | H04L 65/80 709/233 |
| 2014/0181266 | A1* | 6/2014 | Joch ...................... | H04L 65/765 709/219 |
| 2022/0303332 | A1* | 9/2022 | Szász ..................... | H04L 65/80 |

\* cited by examiner

*Primary Examiner* — Kenneth R Coulter

(57) ABSTRACT

Systems and methods for scoring audio/video (A/V) sessions may include a first client which identifies an A/V signal for a session of an A/V application between the first client and a second client, and metrics of a network path between the first client and the second client. The first client may determine a first score for the A/V signal by applying one or more features corresponding to the A/V signal to a model trained to generate the first score. The client may generate a session score for the session based on the first score and the metrics of the network path.

20 Claims, 10 Drawing Sheets

SYSTEMS AND METHODS FOR SCORING AUDIO OR VIDEO SESSIONS

CROSS-REFERENCE TO RELATED APPLICATION

This application claims priority to and the benefit of Indian Provisional Patent Application No. 202241022278, titled "SYSTEMS AND METHODS FOR SCORING AUDIO OR VIDEO SESSIONS," and filed on Apr. 14, 2022, the contents of all of which are hereby incorporated herein by reference in its entirety for all purposes.

FIELD OF THE DISCLOSURE

The present application generally relates to network communications. In particular, the present application relates to systems and methods scoring audio or video sessions.

BACKGROUND

Clients may communicate via audio/video (A/V) applications, such as voice over internet protocol (VOIP) applications. Some clients may execute the A/V application(s) locally, while other clients may access hosted A/V applications.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

As voice over internet protocol (VOIP) and other audio/video conferencing or calling resources (generally referred to as A/V resources) are deployed, it can be challenging to accurately determine or assess a quality of such resources. Such resources may be native or locally-executing applications or resources on a computing device, or may be accessed within a hosted computing environment (e.g., provided by an enterprise). For instance, it can be challenging for an enterprise to understand, qualify, or otherwise assess the audio or video performance of the various hosted A/V applications or resources in hosted computing environment or workspace. This need has been aggravated with as the workforce moves to remote computing environments, hosted computing environments, and even more generally remote work. Furthermore, the number of audio/video conferencing being conducted in the workforce has continued to increase in recent years, and typically increases on a per-employee basis as employees increase in seniority. Thus, for such enterprises, providing optimal audio and video quality is important to ensure that meetings are proceeding smoothly.

Some A/V applications may include a feedback mechanism for soliciting/obtaining feedback on the call/video quality. However, such metrics may often be biased, as some users may only provide feedback during poor network conditions or general call/video quality. Solutions which may not implement the current systems and methods may not consider audio call quality itself (e.g., through analysis of the audio signals exchanged between clients) as part of calculating or determining a user experience score. For example, some solutions may calculate, compute, or otherwise determine a session or user experience score based on network metrics (such as round trip time (RTT), packet loss rate, jitter, bit rate, etc.). However, such network metrics may not reflect the entire network path between the clients which are participating in the call/video conference. For instance, and particularly relevant to where the A/V applications or resources are accessed via a hosted environment, the network metrics may reflect the network path between the respective hosted servers rather than the network path between the clients. Furthermore, some hosted environments may include call or video conferencing optimization where a peer-to-peer connection between the clients may be established for the A/V application, effectively bypassing communications via the hosted servers. Where the peer-to-peer connection is established, the network metrics for the network path between the hosted servers may be irrelevant to the peer-to-peer connection.

A given A/V session of an A/V application may include any number of clients. In one or more embodiments of the systems and methods described herein, a client may be configured to identify an A/V signal for a session of an A/V application between the client and another client (e.g., a second client) and metrics of a network path between the clients. The client may be configured to determine a first score for the A/V signal by applying one or more features extracted from the A/V signal to an A/V model. The client may be configured to generate a session score for the session based on the first score and the metrics of the network path.

According to the systems and methods described herein, a generated session score may be based on metrics of the network path and/or A/V signals themselves. For instance, the systems and methods described herein derive, detect, or otherwise identify scores for A/V signals themselves, thus providing objective indications of the audio or video quality for the session. Furthermore, by identifying features of the network path between the clients, and particularly relevant to A/V applications accessed in hosted environments, the systems and methods described herein may evaluate audio/video quality of actual network conditions between the clients rather than between hosted servers. Such network conditions may include, for instance, client-to-host server-to-host server-to-client connections (e.g., hosted network path(s)) and/or peer-to-peer connections directly between clients (e.g., network paths which bypass the host server(s)). Such implementations and embodiments may more accurately reflect network conditions between the clients, thus providing a more objective and accurate session score for the session between the clients.

Aspects of the present disclosure are directed to systems, methods, and non-transitory computer readable media for generating session scores for sessions of an audio/video (A/V) application. A first client (e.g., one or more processors of the first client) may identify an audio/video (A/V) signal for a session of an A/V application between the first client and a second client and metrics of a network path between the first client and the second client. The first client may determine a first score for the A/V signal by applying one or more features corresponding to the A/V signal to a model trained to generate the first score. The first client may generate a session score for the session based on the first score and the metrics of the network path.

In some embodiments, the first client may store an association between the session score and the session in one or more data structures. In some embodiments, the one or more features may include at least one of a signal strength of the A/V signal or a plurality of mel-frequency cepstral coefficients (MFCCs). In some embodiments, the first score may be determined by applying the signal strength of the A/V signal to a first model. The first device may determine a second score for the A/V signal by applying the plurality of MFCCs to a second model trained to generate the second score. The session score may be generated based on the first score, the second score, and the network path.

In some embodiments, the network path may include at least one of a peer-to-peer path between the first client and the second client, or a hosted path between the first client and the second client through one or more hosted servers. In some embodiments, the metrics for the network path comprise at least one of average round trip time (RTT), minimum RTT, average packet loss rate, minimum packet loss rate, average jitter, minimum jitter, a ratio of average concealed samples, or a bitrate.

In some embodiments, identifying the A/V signal for the session may include intercepting the A/V signal from an A/V feed of the session. In some embodiments, the A/V feed is sampled at a predetermined interval of the session. The A/V signal may be intercepted responsive to detecting a voice in the A/V feed. In some embodiments, the model may include a convolutional neural network (CNN) model trained to predict the first score using training input features and assigned scores. In some embodiments, generating the session score for the session may include applying the first score and the metrics to a session model trained to generate the session score.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles, and concepts. The drawings are not intended to limit the scope of the claims included herewith.

Figure 1A:
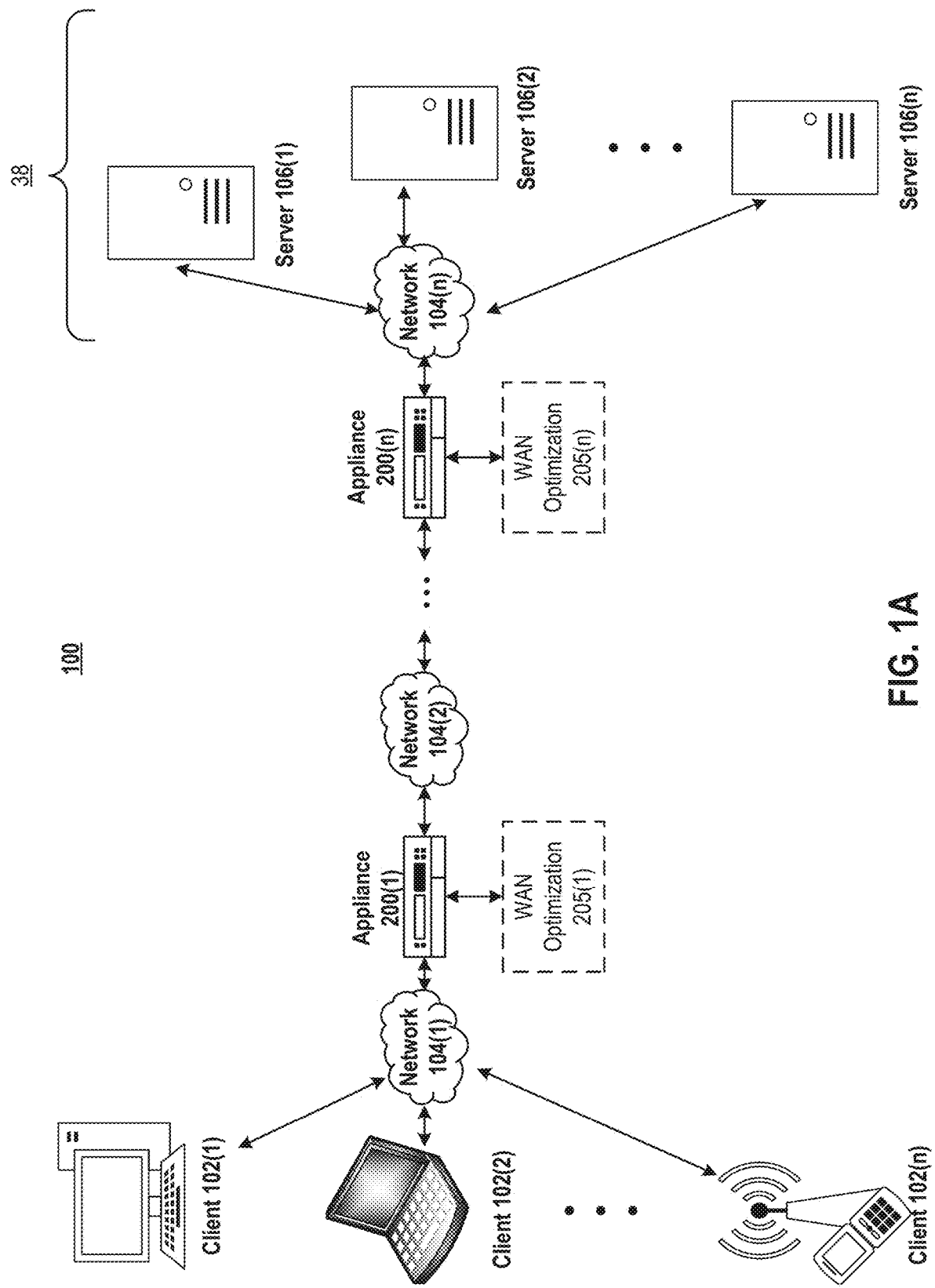
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

As voice over internet protocol (VOIP) and other audio/video conferencing or calling resources (generally referred to as A/V resources) are deployed, it can be challenging to accurately determine or assess a quality of such resources. Such resources may be native or locally-executing applications or resources on a computing device, or may be accessed within a hosted computing environment (e.g., provided by an enterprise). For instance, it can be challenging for an enterprise to understand, qualify, or otherwise assess the audio or video performance of the various hosted A/V applications or resources in hosted computing environment or workspace. This need has been aggravated with as the workforce moves to remote computing environments, hosted computing environments, and even more generally remote work. Furthermore, the number of audio/video conferencing being conducted in the workforce has continued to increase in recent years, and typically increases on a per-employee basis as employees increase in seniority. Thus, for such enterprises, providing optimal audio and video quality is important to ensure that meetings are proceeding smoothly.

Some A/V applications may include a feedback mechanism for soliciting/obtaining feedback on the call/video quality. However, such metrics may often be biased, as some users may only provide feedback during poor network conditions or general call/video quality. Solutions which may not implement the current systems and methods may not consider audio call quality itself (e.g., through analysis of the audio signals exchanged between clients) as part of calculating or determining a user experience score. For example, some solutions may calculate, compute, or otherwise determine a session or user experience score based on network metrics (such as round trip time (RTT), packet loss rate, jitter, bit rate, etc.). However, such network metrics may not reflect the entire network path between the clients which are participating in the call/video conference. For instance, and particularly relevant to where the A/V applications or resources are accessed via a hosted environment, the network metrics may reflect the network path between the respective hosted servers rather than the network path between the clients. Furthermore, some hosted environments may include call or video conferencing optimization where a peer-to-peer connection between the clients may be established for the A/V application, effectively bypassing communications via the hosted servers. Where the peer-to-peer connection is established, the network metrics for the network path between the hosted servers may be irrelevant to the peer-to-peer connection.

A given A/V session of an A/V application may include any number of clients. In one or more embodiments of the systems and methods described herein, a client may be configured to identify an A/V signal for a session of an A/V application between the client and another client (e.g., a second client) and metrics of a network path between the clients. The client may be configured to determine a first score for the A/V signal by applying one or more features extracted from the A/V signal to an A/V model. The client may be configured to generate a session score for the session based on the first score and the metrics of the network path.

According to the systems and methods described herein, a generated session score may be based on metrics of the network path and/or A/V signals themselves. For instance, the systems and methods described herein derive, detect, or otherwise identify scores for A/V signals themselves, thus providing objective indications of the audio or video quality for the session. Furthermore, by identifying features of the network path between the clients, and particularly relevant to A/V applications accessed in hosted environments, the systems and methods described herein may evaluate audio/ video quality of actual network conditions between the clients rather than between hosted servers. Such network conditions may include, for instance, client-to-host server-to-host server-to-client connections (e.g., hosted network path(s)) and/or peer-to-peer connections directly between clients (e.g., network paths which bypass the host server(s)). Such implementations and embodiments may more accurately reflect network conditions between the clients, thus providing a more objective and accurate session score for the session between the clients.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for scoring audio/video sessions.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104(n) (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc., of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc., of Fort Lauderdale, Fla.

Figure 1B:
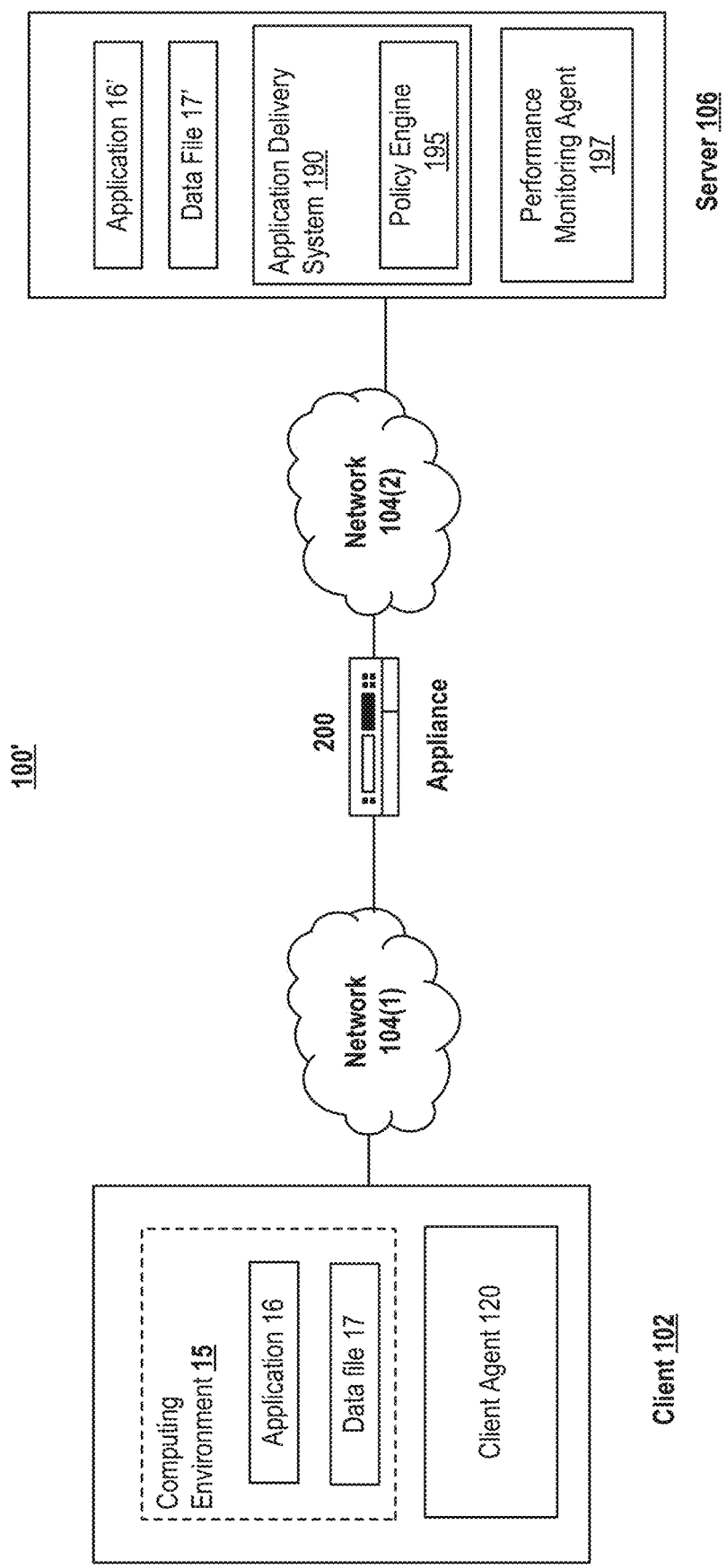
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16, that accesses, processes, or uses a data file 17. Computing environment 15, application 16, and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1)

transport layer connection pooling, 2) transport layer connection multiplexing, 3) transport control protocol buffering, 4) compression, 5) caching, or (6) other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 102 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc., of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc., of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and/or appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
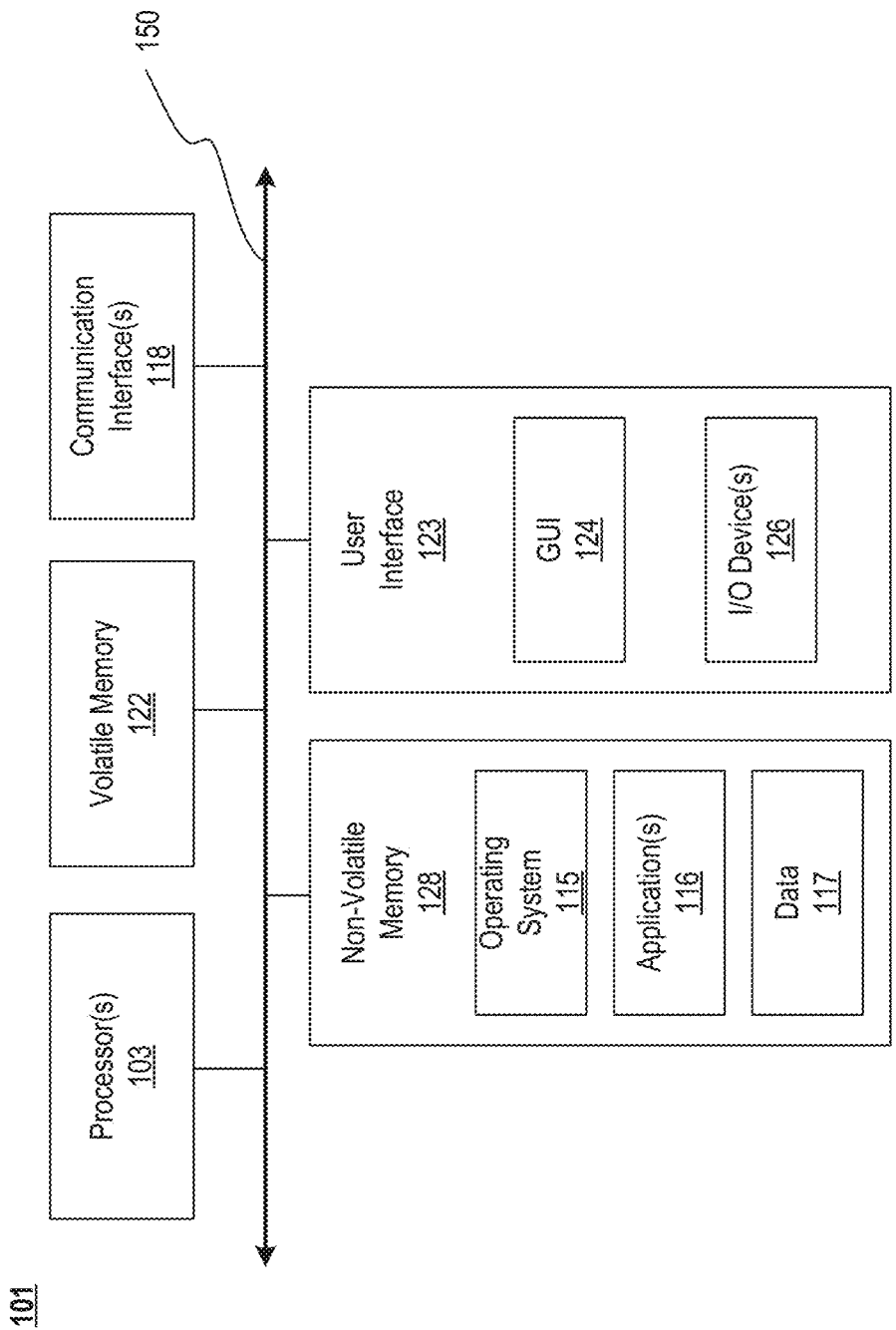
FIG. 1C is a block diagram of a computing device, in accordance with an illustrative embodiment.

As shown in FIG. 1C, computer 101 may include one or more processor(s) 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communication interface(s) 118, and communication bus 150. User interface 123 may include graphical user interface (GUI) 124 (e.g., a touchscreen, a display, etc.) and one or more input/output (I/O) device(s) 126 (e.g., a mouse, a keyboard, etc.). Non-volatile memory 128 stores operating system 115, one or more application(s) 116, and data 117 such that, for example, computer instructions of operating system 115 and/or application(s) 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106, and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors.

Communication interface(s) 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
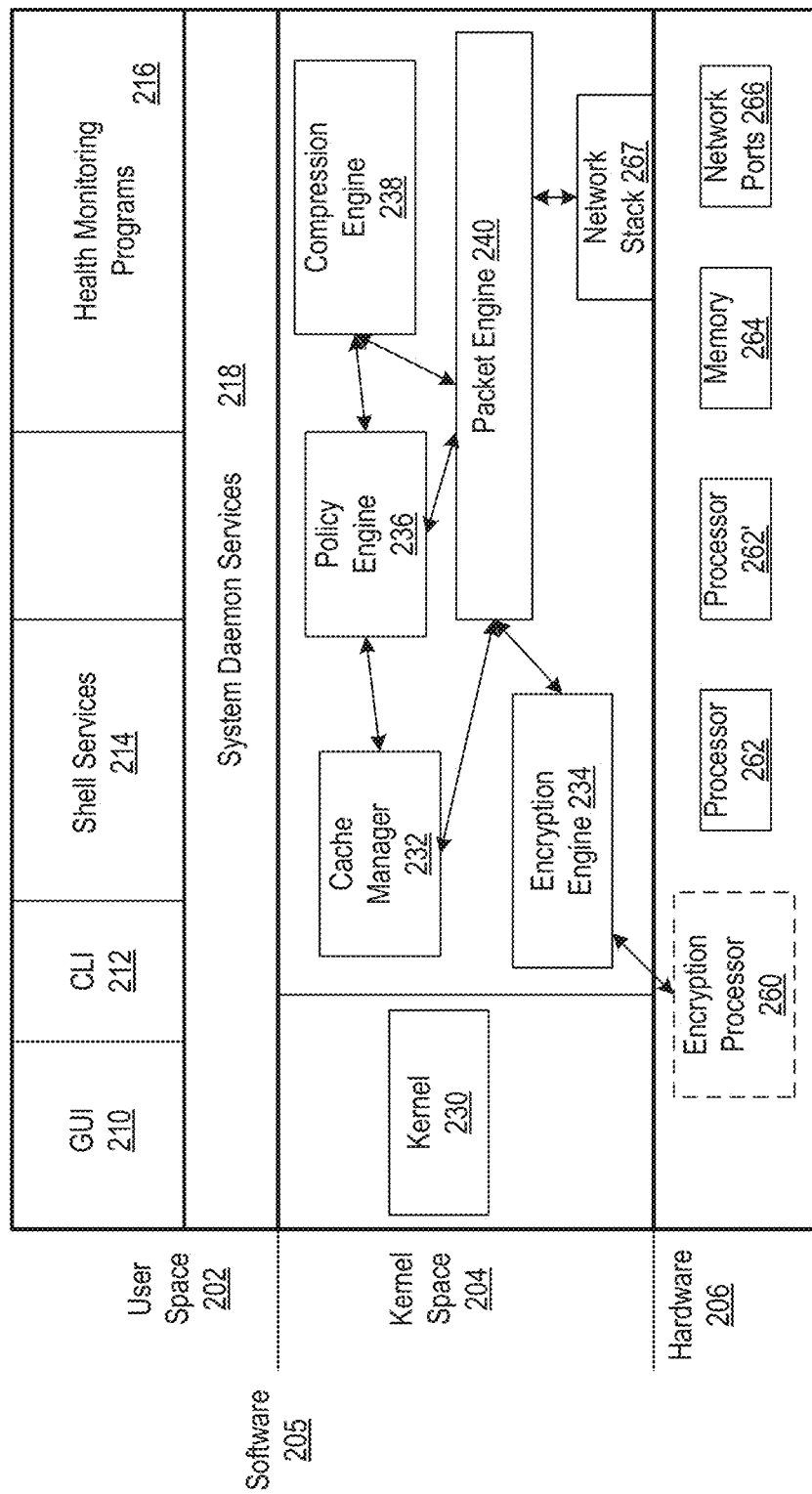
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge, or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP-based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236, and 238 run in the core address space of the operating system of appliance 200, which may reduce the number of data transactions to and from the memory and/or context switches between kernel mode and user mode, for example since data obtained in kernel mode may not need to be passed or copied to a user process, thread, or user level data structure.

Cache manager 232 may duplicate original data stored elsewhere or data previously computed, generated, or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliance 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stack 267 to send and receive network packets via network ports 266. Packet engine 240 may operate in conjunction with encryption engine 234, cache manager 232, policy engine 236, and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports, and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service, or task is active and currently running, check status, error or history logs provided by any program, process, service, or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed, or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route, or load-balance any communications provided via any protocol carried by the transport layer.

In some embodiments, client agent 120 is implemented as an Independent Computing Architecture (ICA) client developed by Citrix Systems, Inc., of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
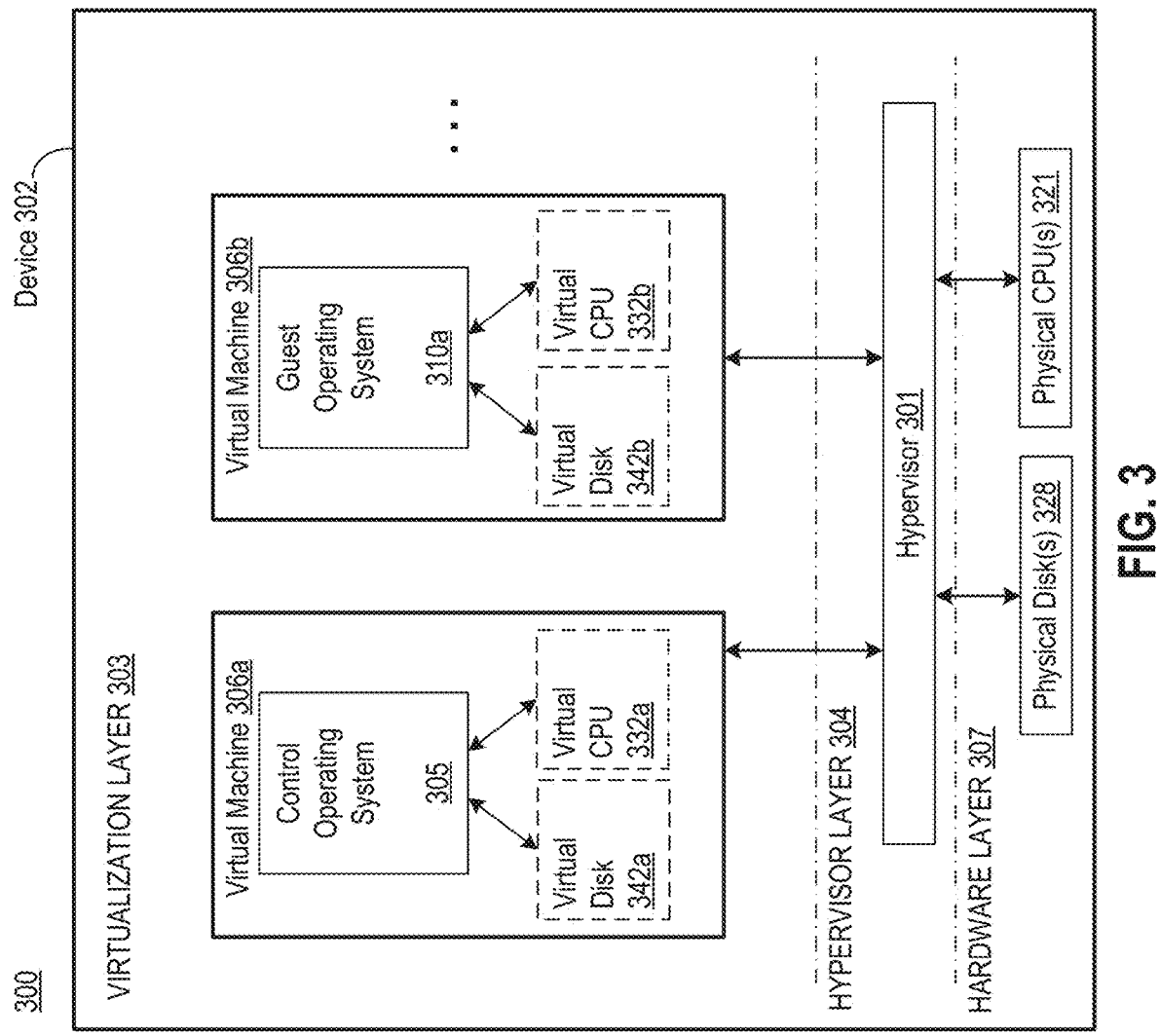
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106, or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2, and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load, or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106, or appliance 200, such that the functionality may be implemented across multiple devices, such as a cluster of computing devices, a server farm, or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
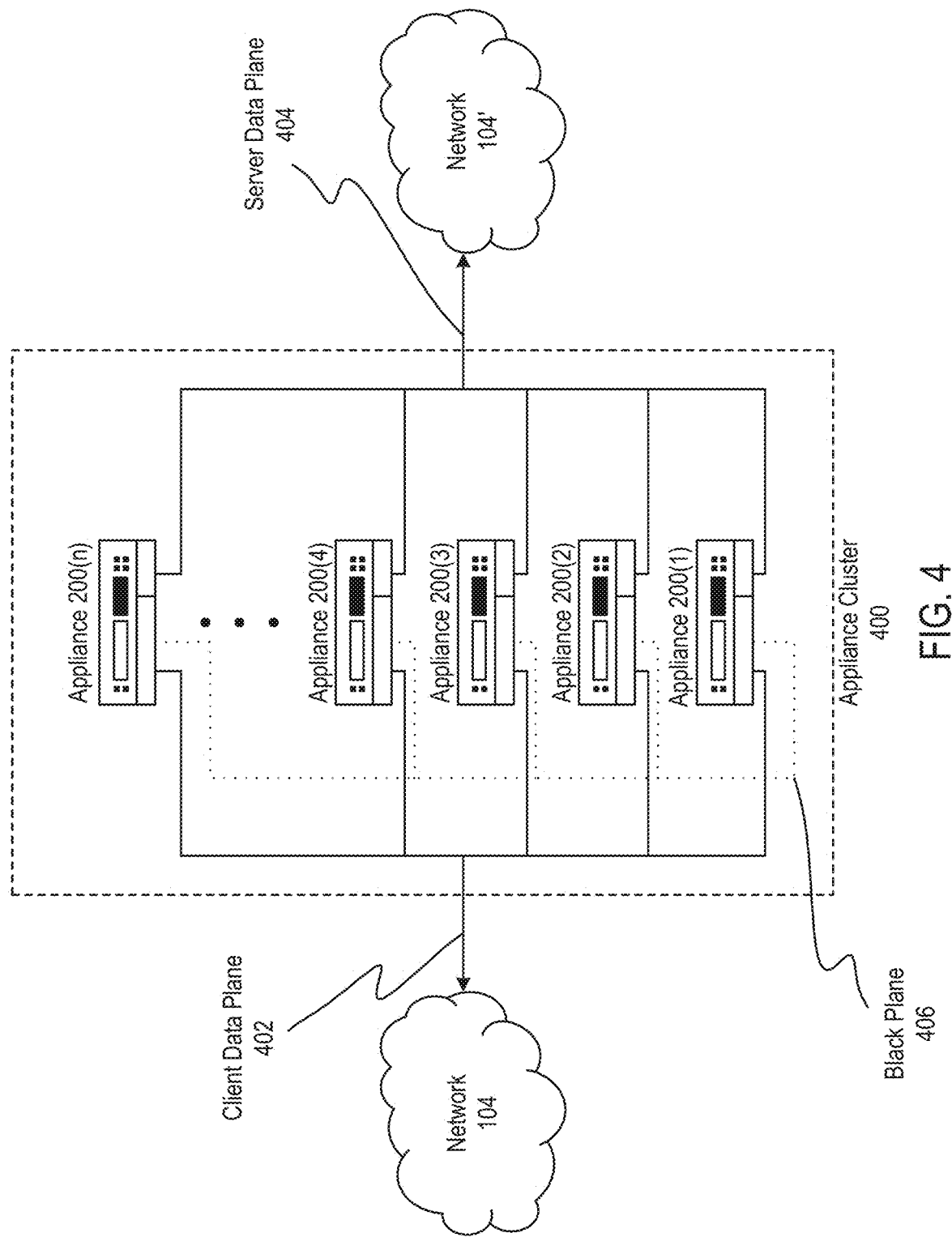
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or black plane 406. Black plane 406 may enable inter-node or inter-appliance control and configuration messages, for inter-node forwarding of traffic, and/or for communicating configuration and control traffic from an administrator or user to cluster 400. In some embodiments, black plane 406 may be a physical network, a VPN or tunnel, or a combination thereof.

E. Systems and Methods for Scoring Audio/Video Sessions

Figure 5:
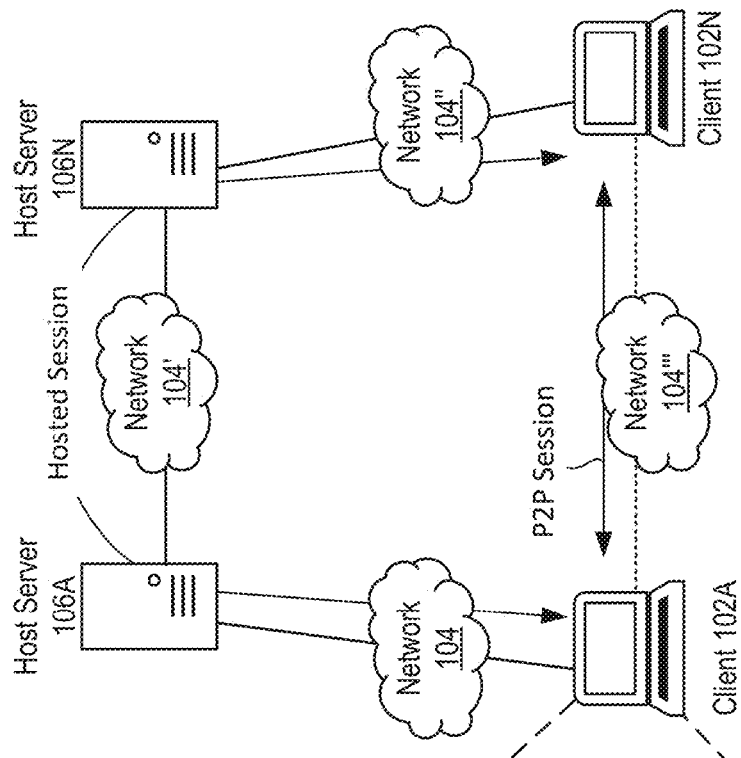
FIG. 5 is a block diagram of an embodiment of a system for scoring audio/video sessions in accordance with an illustrative embodiment.
Figure 5:
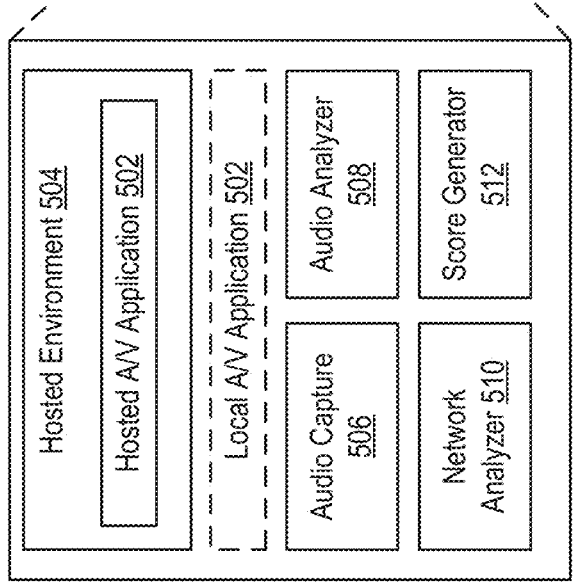

Referring now to FIG. 5, depicted is a system 500 for scoring audio/video (hereinafter referred to as A/V or AV) sessions, in accordance with an illustrative embodiment. The system 500 may include one or more clients 102A-102N (hereinafter generally referred to as clients 102) and one or more host servers 106A-106N (hereinafter generally referred to as servers 106 or host servers 106). The clients 102 may be configured to launch, deploy, or otherwise access various A/V applications 502 (e.g., either hosted A/V applications 502 in a hosted environment 504, or native/local A/V applications 502 executing locally on the clients 102). The clients 102 may include an audio capture 506, an audio analyzer 508, a network analyzer 510, and a score generator 512. In overview, the audio capture 506 may be configured to identify an A/V signal for a session of an A/V application 502 between a first client 102A and a second client 102N. The audio analyzer 508 may be configured to identify or detect one or more A/V features from the A/V signal, and the network analyzer 510 may be configured to identify metrics of a network path between the clients 102A, 102N. The score generator 512 may be configured to determine a first score for the A/V signal by applying the one or more features (e.g., identified by the audio analyzer 508) to an A/V model. The score generator 512 may be configured to determine a session score for the session based on the first score (e.g., for the A/V signal) and the metrics for the network path. It is noted that, while shown as being components/elements of the client 102A, similar elements may be incorporated other clients 102N.

The systems and methods of the present solution may be implemented in any type and form of device, including clients, servers and/or appliances as described above with reference to FIG. 1A-FIG. 4. For example, the clients 102 and host server 106 may include components or elements similar to the clients 102 and servers 106 described above. In various embodiments, the clients 102 may be configured to transmit, receive (e.g., transceive) or otherwise exchange data between other clients 102 via one or more network paths (e.g., across, through, or via one or more networks 104). For example, a first client 102A may be configured to exchange data with a second client 102N through the host servers 106A (e.g., along a hosted path). In this example, the network path follows to-and-from client 102A through network 104 to the first host server 106A, from the first host server 106A through network 104' to the second host server 106N, and from the second host server 106N through network 104" to the second client 102N. As another example, the first client 102A may be configured to exchange data with a second client 102N (e.g., along a peer-to-peer path) and bypass the hosted servers 106. In this example, the network path follows from the client 102A though network 104'" to the second client 102N. While shown as single networks 104 between devices 102, 106, it is noted that any number of networks/switches/hops may be located along the hosted/peer-to-peer network paths. However, the peer-to-peer path effectively bypasses the host servers 106A, and as such is typically a "shorter" network path than the hosted path.

In some embodiments, where a client 102 accesses the A/V application 502 via the hosted environment 504, the network path may still be the peer-to-peer network path. For example, when the first and second client 102 establish or negotiate an A/V session, the clients 102 (e.g., the hosted environment 504, other components of the clients 102/host servers 106, or the hosted application 502) may be configured to determine, detect, or otherwise identify the peer-to-peer network path (e.g., by negotiating a peer-to-peer channel or connection on which to establish the A/V session). Such implementations or embodiments may reduce lag or latency of the A/V session by shortening the network path between the clients 102. In various embodiments, the clients 102 may negotiate to establish the A/V session for the A/V application 502 between the clients 102 along one or more of the above-mentioned network paths. While described hereinafter within the context of audio signals/audio data, it is noted that similar processes may be implemented for analysis of video signals/video data. Additionally, the systems and methods described herein may be used for assessing/predicting/scoring audio quality across many different contexts, such as scoring audio/video accessed via audio/video streaming services, scoring audio or video retrieved from one or more remote storage locations, etc.

The client 102 is shown to include an audio capture 506. The audio capture 506 may be or include any device, component, element, or hardware designed or implemented to obtain, detect, capture, intercept, or otherwise identify audio signals from an audio session established between the clients 102. In some embodiments, the audio capture 506 may be configured to extract the audio signals from the A/V session along the network path between the clients 102. In some embodiments, the audio capture 506 may be configured to sample the audio signals at various intervals (e.g., every N seconds, N minutes, etc.) from the A/V session. In some embodiments, the audio capture 506 may be configured to extract the audio signals responsive to detecting a voice from the sampled audio signals of the session. For example, the audio capture 506 may include or otherwise access a voice activation detection (VAD) system. The VAD system may include software configured to identify or detect a voice or speech from audio signal data. The audio capture 506 may be configured to provide the sampled audio signals to the VAD system to determine whether a voice or speech is detected. The audio capture 506 may be configured to identify an audio signal from the sampled audio signals based on the VAD system detecting the voice or speech in the identified audio signal. The audio capture 506 may be configured to extract the audio signal from the session responsive to the VAD system detecting voice or speech in the audio signal.

The audio capture 506 may be configured to intercept or sample data (e.g., at various increments) of the audio session at various intervals, and apply the sampled audio data to the VAD system. The VAD system may be configured to indicate whether the sampled audio data includes voice or speech. In some embodiments, the audio capture 506 may be configured to apply the sampled audio in series to the VAD system until the VAD system detects voice or speech in the sampled audio data. For example, if at the start of a five minute sample interval, the audio capture samples audio data every five seconds for the sample interval, the audio capture 506 may be configured to apply the sampled audio data in series (e.g., every five seconds) to the VAD system until the VAD system detects voice or speech. When the VAD system detects speech in the sampled audio data, the audio capture 506 may identify the sampled audio data as the audio signal. Where the VAD system does not detect speech in any of the sampled audio data (e.g., any incremental sample across the sample interval), the audio capture 506 may identify the most recent sampled audio data as the audio signal. Continuing the above example, where the VAD system does not detect speech in any of the 72 audio samples (e.g., five second sample increments across five minute interval) for the five minute sample interval, the audio capture 506 may identify the audio signal as the most recent sample (e.g., sample captured at 4:55).

The audio capture 506 may be configured to identify audio signals at various intervals. For example, the audio capture 506 may be configured to identify audio signals every N minutes (e.g., every 5 minutes, 10 minutes, 15 minutes, etc.) for the session. As such, where a given audio or video session lasts for longer than the interval at which the audio signals are identified, the audio capture 506 may be configured to identify several audio signals for a given session. Each of the audio signals may be used for scoring the session between the clients 102, as described in greater detail below.

The client 102 is shown to include an audio analyzer 508. The audio analyzer 508 may be or include any device, component, element, or hardware designed or implemented to obtain, detect, extract, quantify, or otherwise determine one or more features from the audio signals obtained by the audio capture 506. In some embodiments, the audio analyzer 508 may be configured to determine features from each of the audio signals obtained by the audio capture 506. In some embodiments, the audio capture 506 may be configured to forward, communicate, transmit, send, or otherwise provide the audio signals to the audio analyzer 508 to determine the one or more features for the audio signal. In some embodiments, the audio capture 506 may be configured to provide the audio signals responsive to the audio capture 506 identifying the audio signals. In other words, the audio analyzer 508 may be configured to identify/determine the features for the audio signals in substantially real-time (e.g., during the audio/video session).

Figure 6:
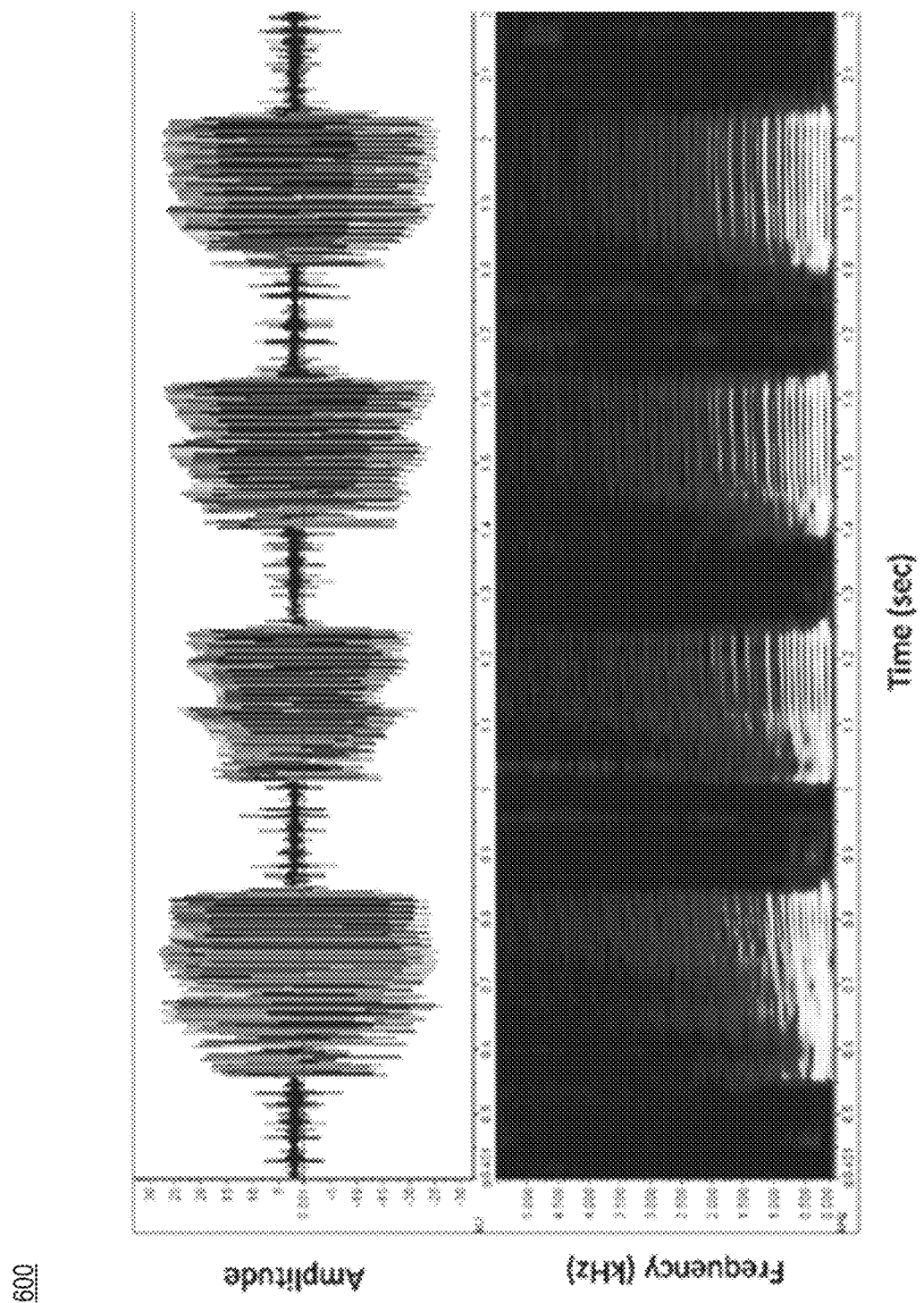
FIG. 6 is a graph showing one or more features which may be extracted from audio data in accordance with an illustrative embodiment.

In some embodiments, the audio analyzer 508 may be configured to determine a spectrogram for the audio signal. Referring specifically to FIG. 6, depicted is a graph 600 one or more features which may be extracted from an audio signal, according to an example implementation. The audio analyzer 508 may be configured to generate the spectrogram as an output based on the audio signal identified by the audio capture 506. The graph 600 may be a graphical representation of a spectrogram, which may include an audio amplitude and an audio frequency over time. The spectrogram may be a visual way of representing the signal strength, or "loudness," of the audio signal over time at various frequencies present in a particular waveform. The spectrogram may depict a change in energy at different frequencies, thus depicting how energy levels for the audio signals vary over time. In some embodiments, the audio analyzer 508 may be configured to generate a matrix (e.g., three-dimensional matrix) which represents the spectrogram. As such, while shown as an image, it is noted that the spectrogram shown in FIG. 6 is simply for illustrative purposes. As described in greater detail below, the score generator 512 may be configured to generate the session score based on the spectrogram determined by the audio analyzer 508.

In some embodiments, the audio analyzer 508 may be configured to determine one or more mel-frequency cepstral coefficients (MFCCs) for the audio signal. In sound processing, the mel-frequency ceptstrum may be or include a representation of a short-term power spectrum of a sound, based on a linear cosine transform of a log power spectrum on a nonlinear mel-scale of frequency. As such, the MFCCS may be or include coefficients that collectively make up an MFC. The audio analyzer 508 may be configured to determine or derive the MFCCs from a type of cepstral representation of the audio clip (a nonlinear "spectrum-of-a-spectrum"). The difference between the cepstrum and the mel-frequency cepstrum is that in the MFC, the frequency bands may be equally spaced on the mel scale, which approximates the human auditory system's response more closely than the linearly-spaced frequency bands used in the normal spectrum. This frequency warping can allow for better representation of sound. The audio analyzer 508 may be configured to determine the MFCCs for the audio signal by taking a Fourier transform of the audio signal, and map powers of the spectrum obtained via the Fourier transform to the mel-scale. In some embodiments, the audio analyzer 508 may be configured to map the spectrum to the mel-scale using triangular overlapping windows. In some embodiments, the audio analyzer 508 may map the spectrum to the mel-scale using cosine overlapping windows. In at least some of these embodiments, the audio analyzer 508 may be configured to compute logs of the powers mapped to the mel-scale at each of the mel frequencies. The audio analyzer 508 may be configured to compute a discrete cosine transform of the list of mel-log powers. The analyzer 508 may be configured to determine the MFCCs as the amplitudes of the resulting spectrum from computing the cosine transform. In some embodiments, the audio analyzer 508 may determine or identify 13 MFCCs for the audio signal (though any number of MFCCs may be computed or determined). The audio analyzer 508 may be configured to output a matrix corresponding to the MFCCs (e.g., a 13×N matrix, where N is the frame size for the audio signal).

The client 102 is shown to include a network analyzer 510. The network analyzer 510 may be or include any device, component, element, or hardware designed or implemented to obtain, detect, extract, quantify, or otherwise determine one or more metrics of the network path between the clients 102. In some embodiments, the network analyzer 510 may be configured to determine the network path on which the session is established between the clients 102. The metrics may include, for example, a round trip time (e.g., an average and/or minimum round trip time), a packet loss rate (e.g., average and/or minimum), a jitter (e.g., average and/or minimum), a ratio of average concealed samples, a bitrate, etc. In some embodiments, the network analyzer 510 may be configured to determine the metrics for the session on which the audio data is transmitted for the session between the clients 102. In other words, the network analyzer 510 may be configured to determine metrics for the same network path for the session. As an example, where the session is a peer-to-peer session (e.g. through or on network 104'''), the metrics may be for the network path through the network 104'''. On the other hand, where the session is a hosted session, the metrics may be for the network path through networks 104, 104', and 104''.

In some embodiments, the network analyzer 510 may be configured to determine the network path responsive to the clients 102 establishing the session. In some embodiments, as part of negotiating the session, the clients 102 may negotiate whether the session is to be a peer-to-peer session or a hosted session. The network analyzer 510 may be configured to determine the network path based on or responsive to negotiation of the session. In some embodiments, the network analyzer 510 may be configured to incorporate, attach, embed, or otherwise provide packets (e.g., test packets or signals) into the session to measure, acquire, or otherwise determine the metrics of the network path between the clients 102. In some embodiments, the network analyzer 510 may be configured to use the session data itself to determine the metrics of the network path between the clients 102. In various embodiments, the metrics may be indicative of the network path used for transmitting/receiving/exchanging the audio data of the A/V session.

Figure 7:
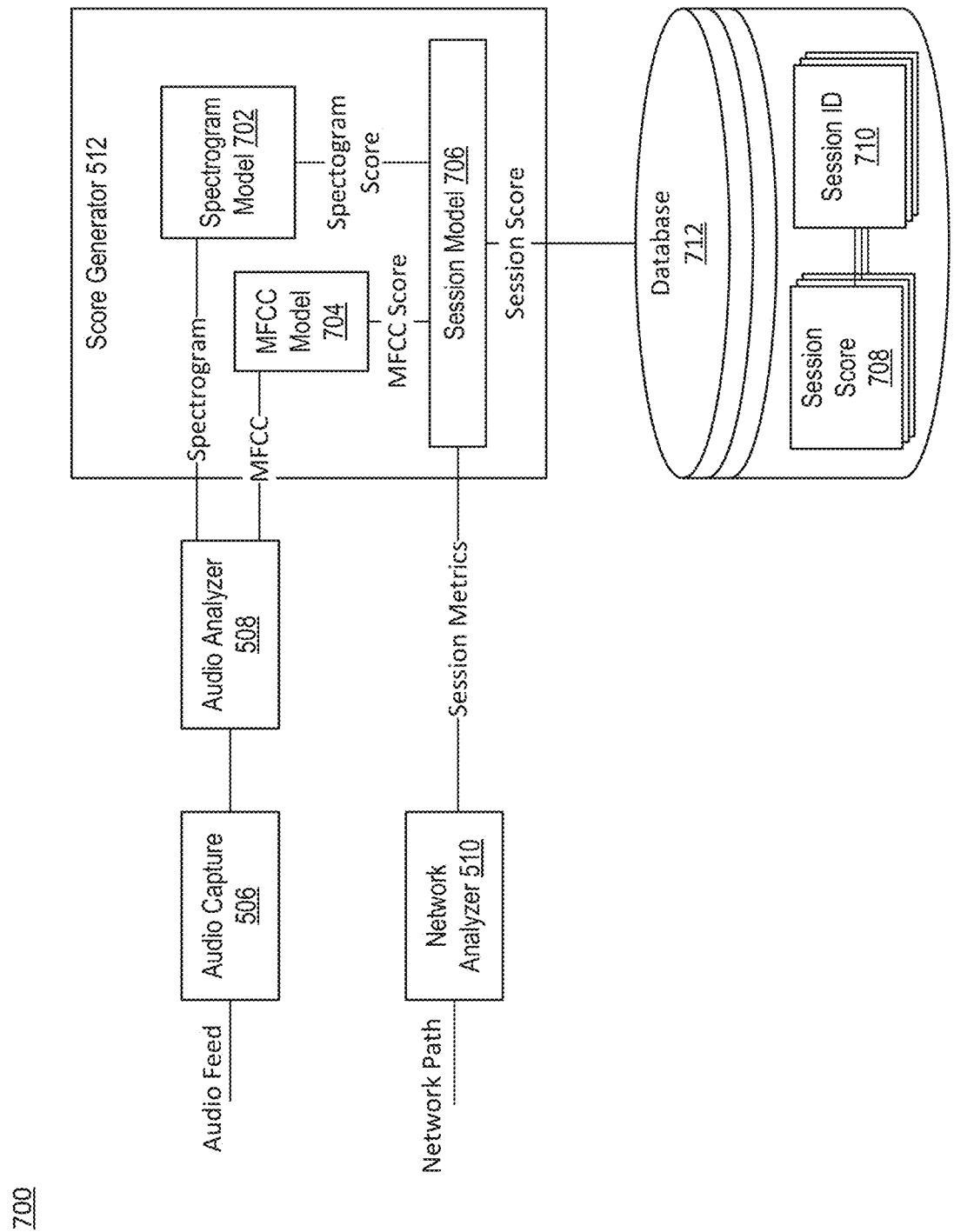
FIG. 7 is a block diagram of the system of FIG. 5 including a score generator in accordance with an illustrative embodiment.

Referring now to FIG. 5 and FIG. 7, the client 102 is shown to include a score generator 512. The score generator 512 may be or include any device, component, element, or hardware designed or implemented to obtain, detect, quantify, compute, determine, or otherwise generate one or more scores based on the session between the clients 102. In some embodiments, the score generator 512 may be configured to generate a plurality of scores based on the session. For example, the score generator 512 may be configured to generate one or more audio score(s) based on the feature(s) of the audio signal (e.g., generated by audio analyzer 508) and a session score based on the audio score(s) and the metrics from the network analyzer 510.

As shown in FIG. 7, the score generator 512 may be configured to receive the feature(s) identified, determined, or extracted by the audio analyzer 508 (such as the MFCC and spectrogram as described above) and the session metrics identified by the network analyzer 510. The score generator 512 may include, maintain, or otherwise access various models for generating, computing, or otherwise determining the scores for the session. In some embodiments, the models may include a spectrogram model 702, an MFCC model 704, and a session model 706. The models may be trained to receive various inputs and generate (e.g., as an output) a score. For example, the spectrogram model 702 may be trained to receive the spectrogram (or data corresponding to the spectrogram) for the audio signal as an input, and output a corresponding spectrogram score. Similarly, the MFCC model 704 may be trained to receive the MFCCs for the audio signal, and output a corresponding MFCC score. The session model 706 may be trained to receive the MFCC score, spectrogram score, and session metrics as an input, and output a corresponding session score for the audio signal.

In some embodiments, the models may be or include convolutional neural networks (CNNs). In some embodiments, nodes and weights for the nodes of the CNNs may be trained using supervised training data, which may include training features for audio signals and labels of the audio signals. In various implementations, the training data may be compiled using actual audio data from sessions between clients and scores provided by the users following the call. For example, the audio data may be featurized and fed into the models along with the scores of the audio data for training the models. In some embodiments, the models may be retrained at various intervals or time periods. For example, the models may be trained in a fixed time period (e.g., weekly, bi-weekly, monthly, quarterly, etc.) using newer annotations, scores, etc. which are received from users following an audio/video call via the A/V application 502.

In some embodiments, the spectrogram model 702 and MFCC model 704 may be separate CNNs which are trained as mentioned above. The session model 706 may be or include a supervised machine learning (ML) regression model. The session model 706 may be trained with training input data including MFCC/spectrogram scores along with network metrics (e.g., avg RTT, min_RTT, avg packet loss_rate, min_packet loss rate, bitrate, etc.) for determining a predicted quality score for the session.

In some embodiments, the score generator 512 may be configured to apply the features (e.g., spectogram and MFCC) for each of the separate audio signals identified for a given session to the corresponding models 702, 704 to generate MFCC score(s) and spectrogram score(s). In other words, a given session may have several MFCC score(s) and spectrogram score(s) for several audio signals identified in the session. In some embodiments, the score generator 512 may be configured to compute, determine, or otherwise generate averages for the MFCC score(s) and spectrogram score(s). The score generator 512 may be configured to apply the average MFCC score and average spectrogram score to the session model 706 as an input. The score generator 512 may be configured to apply the session metrics (such as avg RTT, min_RTT, avg packet loss_rate, min_packet loss rate etc.) to generate a session score for the audio session.

In some embodiments, the score generator 512 may be configured to determine, compute, or otherwise identify a session score based on the audio feature score(s) (e.g., the MFCC score and/or spectrogram score) for the audio session. In some embodiments, the quality score may be a factor for determining the session score. For example, and in some embodiments, the score generator 512 may be configured to maintain or otherwise access one or more rules for determining the session score for a session. Table 1 below shows an example relationship between the session metrics, the audio feature(s) score, and session score, which may be applied by the score generator 512 for identifying the session score.

TABLE 1

Session Score Table

| Session Metrics | Audio Feature(s) Score | Session Score |
| --- | --- | --- |
| Excellent | Poor | Poor |
| Fair | Excellent | Fair |
| Fair | Poor | Poor |

In some embodiments, the score generator 512 may apply one or more weights to the audio feature scores and/or the session metrics for determining the session score. For example, the score generator 512 may apply weights to the audio feature scores based on how much of the session time the call lasted. For example, the weight given to audio feature(s) score may be the ratio of call time to session time. In this example, the weight of the session metrics may be the inverse, or 1—the ratio of call time to session time. Such implementations and embodiments may actively help organizations to better improve their audio quality based on the above index and drill down into the factors that impacts audio quality. As organizations move more towards virtual meetings, evaluation of audio quality may become a considerable factor for the organization to have best effective meetings. In various implementations, some organizations may not want audio signal processing. In such implementations, the systems and methods described herein may only consider network path metrics for determining the session score for a given session. While limited to network parameters, the accuracy of the predicted session score might be slightly compromised, though this may still provide an indication of overall session quality.

The score generator 512 may be configured to store the session score 708 in association with a session identifier (ID) 710 for the session. For example, the score generator 512 may store the session score 708 in association with the session ID 710 in one or more databases 712 or data stores. The databases 712 may be local (e.g., on the client 102), remote databases 712 (e.g., on the hosted server 106 or some other location), etc.

Figure 8:
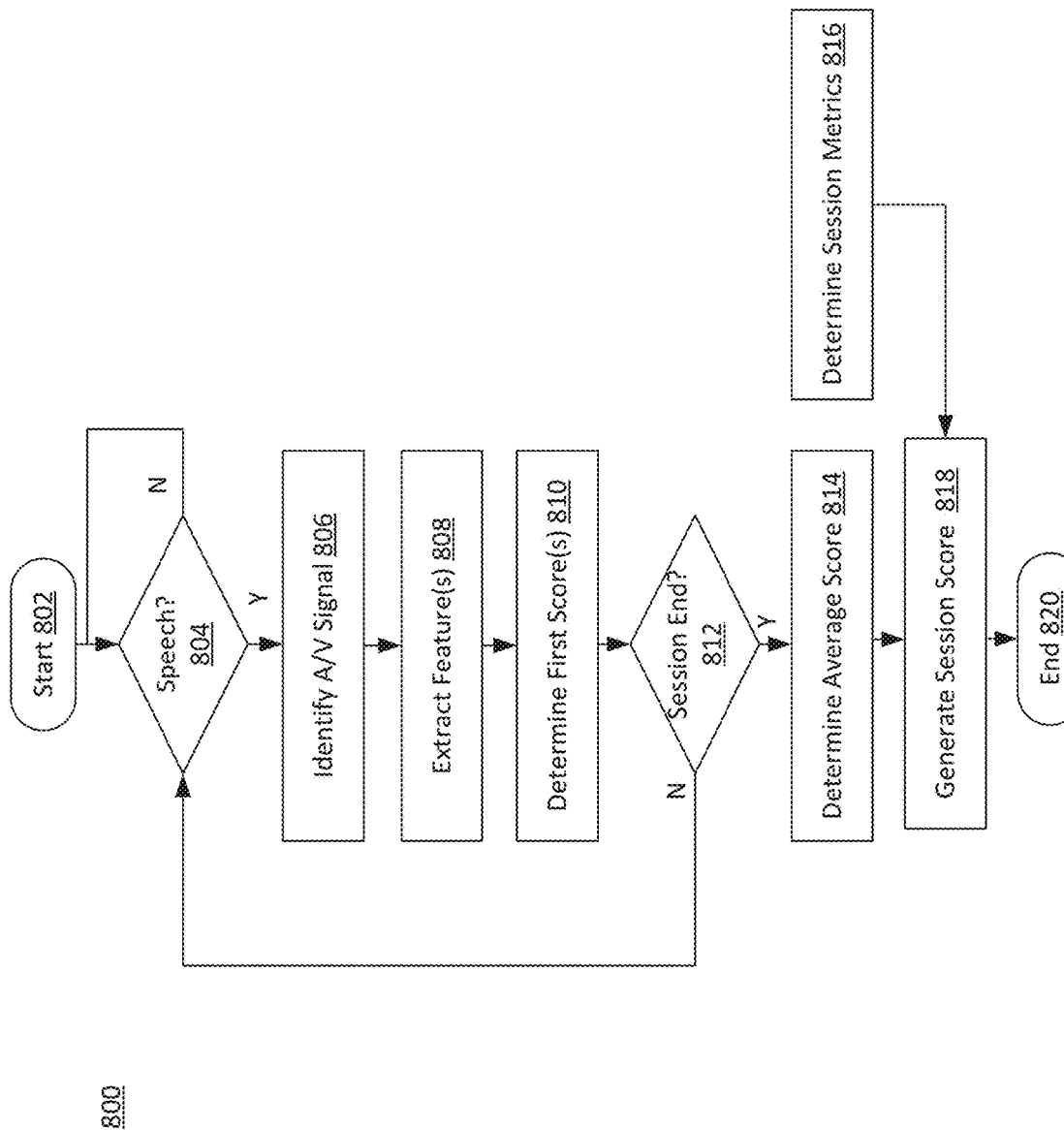
FIG. 8 is a flow diagram of a method for scoring audio/video sessions in accordance with an illustrative embodiment.

Referring now to FIG. 8, depicted is a flowchart showing a method 800 of scoring audio/video sessions, according to an example implementation of the present disclosure. The method 800 may be implemented or performed by one or more of the devices described above with reference to FIG. 1-FIG. 7, such as the clients 102. As a brief overview, at step 802, the method 800 begins. At step 804, a client determines whether speech is detected. At step 806, the client identifies an audio/video (A/V) signal. At step 808, the client extracts features. At step 810, the client determines first score(s). At step 812, the client determines whether the session has ended. If the session has not ended (and following a time interval), the method 800 may loop back to step 804. If the session has ended, the method 800 may proceed to step 814. At step 814, the client may determine an average score. At step 816, the client may determine session metrics. At step 818, the client may generate a session score. At step 820, the method 800 may end.

At step 802, the method 800 begins. The method 800 may begin responsive to clients establishing a session (e.g., an audio/video call or conference, etc.). The method 800 may begin responsive to a client launching an A/V application (e.g., in a hosted environment or a native environment). The method 800 may begin responsive to a network path for the session being established by the clients. The method 800 may begin responsive to the session between the clients commencing. The method 800 may begin responsive to the clients exchanging audio data (e.g., voice data or other audio data) on the session.

At step 804, a client determines whether speech is detected. In some embodiments, the client may determine whether speech is detected by sampling audio data of the session at various intervals. The client may determine whether speech is detected by applying sampled audio data to a voice activation detection (VAD) system to determine whether speech is detected. Where speech is detected, the method 800 may proceed to step 806. However, where speech is not detected, the method 800 may loop until the client determines that speech is detected.

At step 806, the client identifies an audio/video (A/V) signal. In some embodiments, the client may identify the A/V signal for the session of an A/V application between two clients. The client may identify the A/V signal as (or based on/using) the sampled audio data which was determined to include speech. As such, the client may identify the A/V signal from the session by extracting/sampling/intercepting etc. audio data from the session or feed (e.g., live or substantially in real-time).

At step 808, the client extracts features. In some embodiments, the client may extract one or more features from the A/V signal identified at step 806. In some embodiments, the client may extract the feature(s) responsive to the client identifying the A/V signal. In other word, the client may extract the feature(s) during the session (e.g., live or substantially in real-time). In some embodiments, the one or more features may include a signal strength of the A/V signal (such as or indicated by a spectrogram) and/or a plurality of mel-frequency cepstral coefficients (MFCCs).

At step 810, the client determines first score(s). In some embodiments, the client determines the first score(s) for the A/V signal by applying the one or more feature(s) (e.g., extracted at step 808) of the A/V signal to an A/V model. The A/V model may be the MFCC model, the spectrogram model, etc. described above with reference to FIG. 7. However, the A/V model may be or include any model trained to generate an audio quality score corresponding to the A/V signal. In some embodiments, the client determines a plurality of scores. For example, the client may determine a first score for the MFCCs (e.g., an MFCC score) and a second score for the spectrogram or signal strength (e.g., a spectrogram score). In some embodiments, the A/V model may be or include a convolutional neural network (CNN) model trained to predict the score using training input features and assigned scores.

At step 812, the client determines whether the session has ended. If the session has not ended (and following a time interval), the method 800 may loop back to step 804. After the interval, the client may identify further A/V signals, identify feature(s), and determine subsequent score(s). As such, the method 800 may iteratively loop through steps 804-812 until the session has ended. If the session has ended, the method 800 may proceed to step 814.

At step 814, the client may determine an average score. In some embodiments, the client may determine an average score based on the scores determined at step 810 (e.g., each or at least some of the scores determined at each iteration of step 810). The average score may be or include, for instance, an average MFCC, an average signal strength, etc. for the identified A/V signals.

At step 816, the client may determine session metrics. In some embodiments, step 816 may be performed substantially in parallel to other steps of the method 800. For example, the client may determine the session metrics at various intervals throughout the session. The client may determine session metrics for a network path between the clients (e.g., which are active or otherwise established the session). The network path may be, for example, a peer-to-peer path between the first and second clients. The network path may be a hosted path between the clients through one or more hosted servers. The client may determine the session metrics for the session along the network path. The session metrics may include, for example, an average round trip time (RTT), minimum RTT, average packet loss rate, minimum packet loss rate, average jitter, minimum jitter, a ratio of average concealed samples, a bitrate, and/or any other metrics for the network path.

At step 818, the client may generate a session score. In some embodiments, the client may generate the session score for the session based on the first score(s) and the metrics of the network path. The client may generate the session score based on the average score(s) determined at step 814 (which itself is determined based on the first scores 810) and the metrics determined at step 816. In some embodiments, the client may generate the session score by applying the score(s) and metrics to a session model trained to generate the session score. In some embodiments, the client may store the session score in one or more data structures in association with the session (e.g., in association with an identifier, such as a session ID, for the session).

At step 820, the method 800 may end.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus, or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method, comprising:
identifying, by one or more processors of a first client, an audio/video (A/V) signal for a session of an A/V application between the first client and a second client and metrics of a network path between the first client and the second client;
determining, by the one or more processors, a first score for the A/V signal by applying one or more features corresponding to the A/V signal to a first model trained to generate the first score; and
generating, by the one or more processors, a session score for the session based on the first score and the metrics of the network path.

2. The method of claim 1, further comprising storing, by the one or more processors in one or more data structures, an association between the session score and an identifier for the session.

3. The method of claim 1, wherein the one or more features comprise at least one of a signal strength of the A/V signal or a plurality of mel-frequency cepstral coefficients (MFCCs).

4. The method of claim 3, wherein the first score is determined by applying the signal strength of the A/V signal to the first model, the method further comprising:
determining, by the one or more processors, a second score for the A/V signal by applying the plurality of MFCCs to a second model trained to generate the second score, wherein the session score is generated based on the first score, the second score, and the network path.

5. The method of claim 1, wherein the network path comprises at least one of a peer-to-peer path between the first client and the second client, or a hosted path between the first client and the second client through one or more hosted servers.

6. The method of claim 1, wherein the metrics for the network path comprise at least one of average round trip time (RTT), minimum RTT, average packet loss rate, minimum packet loss rate, average jitter, minimum jitter, a ratio of average concealed samples, or a bitrate.

7. The method of claim 1, wherein identifying the A/V signal for the session comprises intercepting, by the one or more processors, the A/V signal from an A/V feed of the session.

8. The method of claim 7, wherein the A/V feed is sampled at a predetermined interval of the session, and wherein the A/V signal is intercepted responsive to detecting a voice in the A/V feed.

9. The method of claim 1, wherein the first model comprises a convolutional neural network (CNN) model trained to predict the first score using training input features and assigned scores.

10. The method of claim 1, wherein generating the session score for the session comprises applying, by the one or more processors, the first score and the metrics to a session model trained to generate the session score.

11. A first client, comprising:
one or more processors configured to:
identify an audio/video (A/V) signal for a session of an A/V application between the first client and a second client and metrics of a network path between the first client and the second client;
determine a first score for the A/V signal by applying one or more features corresponding to the A/V signal to a model trained to generate the first score; and
generate a session score for the session based on the first score and the metrics of the network path.

12. The first client of claim 11, wherein the one or more processors are configured to store, in one or more data structures, an association between the session score and an identifier for the session.

13. The first client of claim 11 wherein the one or more features comprise at least one of a signal strength of the A/V signal or a plurality of mel-frequency cepstral coefficients (MFCCs).

14. The first client of claim 13, wherein the model is a first model, wherein the one or more processors are configured to:
determine a second score for the A/V signal by applying the plurality of MFCCs to a second model trained to generate the second score, wherein the session score is generated based on the first score, the second score, and the network path.

15. The first client of claim 11, wherein the network path comprises at least one of a peer-to-peer path between the first client and the second client, or a hosted path between the first client and the second client through one or more hosted servers.

16. The first client of claim 11, wherein the metrics for the network path comprise at least one of average round trip time (RTT), minimum RTT, average packet loss rate, minimum packet loss rate, average jitter, minimum jitter, a ratio of average concealed samples, or a bitrate.

17. The first client of claim 11, wherein to identify the A/V signal for the session, the one or more processors are configured to:
intercept the A/V signal from an A/V feed of the session, wherein the A/V feed is sampled at a predetermined interval of the session, and wherein the A/V signal is intercepted responsive to detecting a voice in the A/V feed.

18. The first client of claim 11, wherein the model comprises a convolutional neural network (CNN) model trained to predict the first score using training input features and assigned scores.

19. The first client of claim 11, wherein to generate the session score for the session, the one or more processors are configured to apply the first score and the metrics to a session model trained to generate the session score.

20. A non-transitory computer readable medium storing instructions that, when executed by one or more processors, cause the one or more processors to:
identify an audio/video (A/V) signal for a session of an A/V application between a first client and a second client, and metrics of a network path between the first client and the second client;
determine a first score for the A/V signal by applying one or more features corresponding to the A/V signal to a model trained to generate the first score; and
generate a session score for the session based on the first score and the metrics of the network path.

* * * * *